Figure 1:
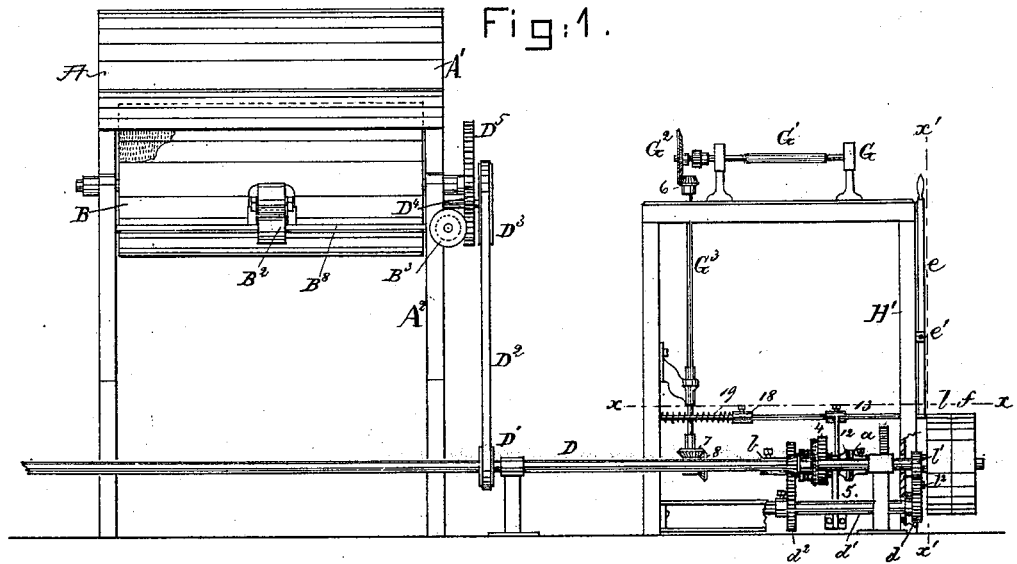

(No Model.)

P. T. BEGLEY.

CARDING MACHINE.

No. 323,021. Patented July 28, 1885.

Witnesses.
Arthur Lipperten.
John F. C. Freinkirk.

Inventor.
Philip T. Begley,
by Crosby & Gregory attys (No Model.) 2 Sheets—Sheet 2.

P. T. BEGLEY.
CARDING MACHINE.

No. 323,021. Patented July 28, 1885.

Witnesses. Inventor.
Philip T. Begley,
by Crosby Gregory attys

UNITED STATES PATENT OFFICE.

PHILIP T. BEGLEY, OF NEWTON UPPER FALLS, MASSACHUSETTS, ASSIGNOR TO PETTEE MACHINE WORKS, OF SAME PLACE.

CARDING-MACHINE.

SPECIFICATION forming part of Letters Patent No. 323,021, dated July 28, 1885.

Application filed September 1, 1884. (No model.)

*To all whom it may concern:*

Be it known that I, PHILIP T. BEGLEY, of Newton Upper Falls, in the county of Middlesex and State of Massachusetts, have invented an Improvement in Carding-Machines, of which the following description, in connection with the accompanying drawings, is a specification, like letters on the drawings representing like parts.

In carding-machines for carding cotton the main cylinder is driven from one source, and is usually kept in constant rotation; but the doffer, feed-rolls, and railway-head are driven from another source and start and stop together. When, for any cause, the railway-head is stopped the doffer and feed-rolls are also stopped, but the main cylinder continues to move, and in its rotation acts to strip the cotton from the teeth of that part of the then stationary doffer opposite or in contact with the teeth of the main cylinder, and at the same time the cotton so detached from one part of the doffer is accumulated thereon immediately below that part of the doffer next the card, and thus the doffer has longitudinally upon it a sort of lump or roll of cotton. In this condition, when the railway-head, doffer, and feed-rolls are again started, and especially if the doffer had been stopped for a few moments, the sliver, being removed from the rotating doffer by the comb, is parted at or near that part of the doffer which, when the latter was stationary, was in contact, as stated, with the teeth of the main cylinder.

The chief object of my invention is to enable the doffer and railway-head to be stopped and started at will without interfering with the continuity of the sliver to be thereafter removed from the doffer by the comb. To do this I have provided means whereby the doffer, when it is to be started, is automatically turned or rotated backward for a portion of a rotation sufficient to carry the teeth which were stripped, as stated, and the accumulated bunch of sliver past the point of contact between the doffer and main cylinder, and thereafter the doffer commences to turn in its proper working direction. The reversal of the direction of rotation of the doffer just before commencing to operate regularly enables the stripped part thereof and the part on which there is too much cotton to be again brought into regular contact with the main cylinder, so that the stripped part of the doffer receives cotton from the main cylinder, and the accumulated fiber on the doffer is in a measure broken up or spread, whereby the film of cotton on the doffer is left in such condition as to enable a continuous sliver to be taken from it by the usual comb.

My invention consists, essentially, in the combination, with the main cylinder and doffer, of mechanism to automatically reverse the movement of the doffer for a short distance prior to starting to turn the same in its regular forward direction, whereby the entire toothed surface of the doffer is provided with cotton, thus avoiding the parting of the sliver as it is removed from the doffer.

Other features of the invention will be hereinafter specifically pointed out in the claims at the end of this specification.

Figure 2:
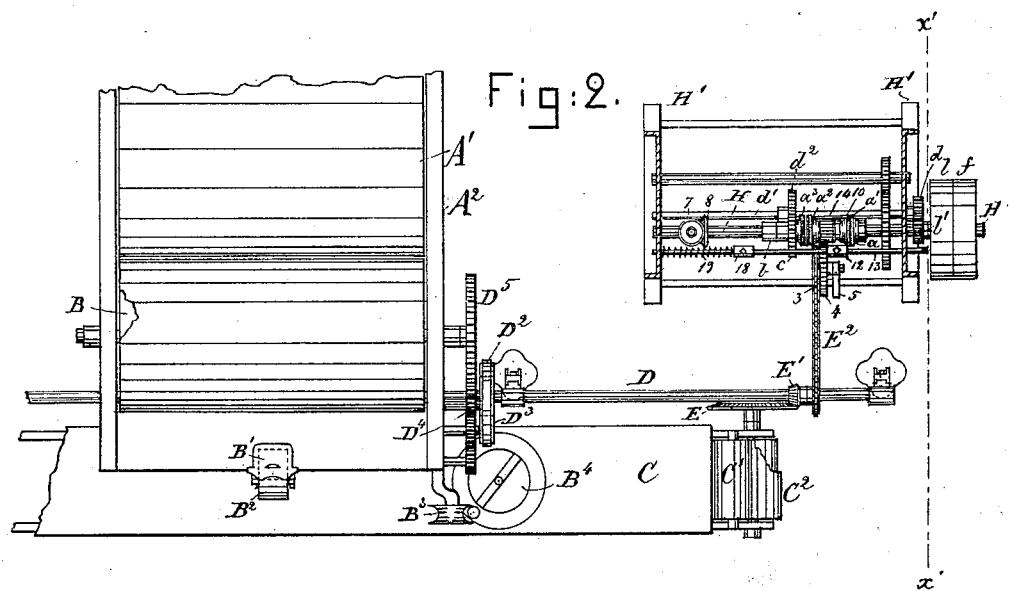
Figure 3:
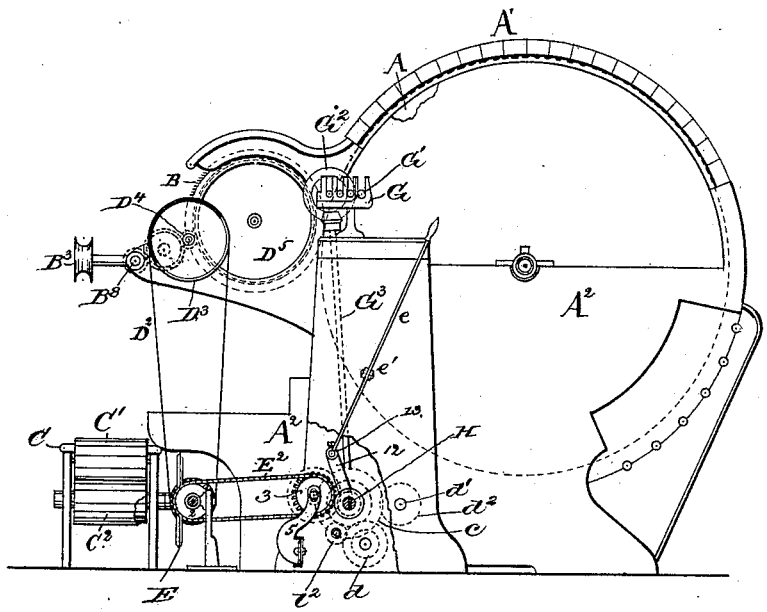

Figure 1 is an elevation of a sufficient portion of one side of a railway-head and the delivery end of a carding-machine to enable my invention to be understood, the box and belts for carrying the sliver from the carding-machine to the railway-head being omitted, as they are plainly shown in other figures, a portion of the doffer casing or cover being broken away. Fig. 2 is a partial top or plan view of Fig. 1, the railway-head above the line $xx$ being removed, a portion of the casing or cover being broken away. Fig. 3 is a section in the line $x'x'$, Fig. 1, looking toward the left, and Fig. 4 is an enlarged detail of a form of clutch or reversing mechanism which I have selected for use.

The main cylinder A, top flats, A', framework $A^2$, doffer B, trumpet B', rolls $B^2$, sheave $B^3$, adjustable guide $B^4$, box C, condensing-roll C', belt $C^2$, shaft D, pulley D', belt $D^2$, pulley $D^3$, pinion $D^4$, gear $D^5$ on the shaft of the doffer, bevel-gear E, bevel-pinion E', sprocket-wheel 2, chain $E^2$, sprocket-wheel 3, the toothed gear 4, to which it is secured, the stand 5, roller-stands G, and rolls G' of the railway-head, (the lower ones only being shown,) the gear $G^2$, shafts $G^3$ and H, and the gears 6 7 8 are all substantially as now commonly in use, so need not be herein particularly described. The shaft H is provided with two pulleys, $f$ and $l$, the pulley $l$ being loose and placed next the frame H' of the railway-head. The shaft H has fast upon it the clutch part $a$ and the collar $b$, and between them the said shaft is provided with a loose quill, hub-shaped, to constitute a gear, 14, with clutch parts $a'\ a^2$ at each end, the quill having an annular groove, 10, to receive a forked arm, 12, fastened to the clutch-shifting slide-rod 13, having suitable bearings on the frame of the railway-head. Between the collar $b$, referred to, and the quill I have placed on the said shaft loosely a toothed gear, $c$, having attached to it at one side a clutch part, $a^3$. The quill, with clutch-teeth at each end, may be moved longitudinally on the shaft H between the clutch parts $a$ and $a^3$ to thus cause one or the other of the ends of the quill to be engaged by one or the other of the clutch parts $a$ or $a^3$, and be rotated in one or the other direction, as will be described. The loose pulley $l$, about which the driving-belt for the railway-head and doffer extends, while the head and doffer are stopped, and which pulley is thus at such time kept running, has a sleeve provided with a pinion, $l'$, which, through an intermediate, $l^2$, engages a pinion, $d$, on and rotates the shaft $d'$, provided with a toothed wheel, $d^2$, which, by its engagement with, rotates the toothed gear $c$, referred to.

Figure 4:
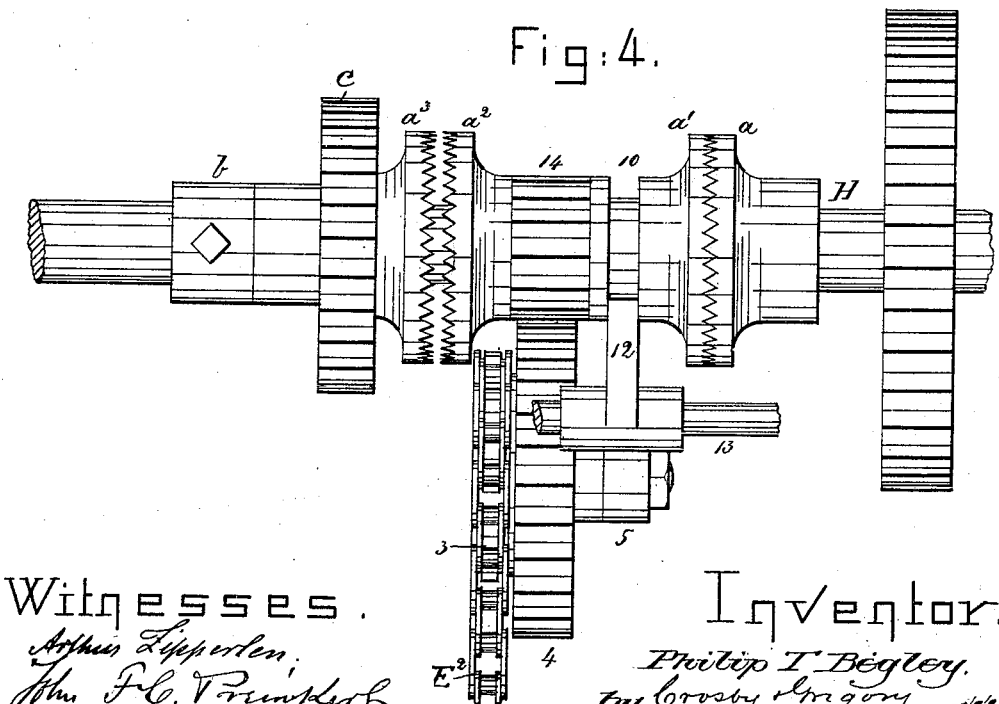

The clutch-shifting slide-bar 13 is provided with a collar, 18, and between the latter and the side frame of the railway-head the said bar is surrounded by a spiral spring, 19, which normally acts to keep the said bar pressed toward the right, as in Figs. 2 and 4, thus, through the finger 12, keeping the right-hand end of the quill, as in said figures, in operative engagement with the clutch part $a$, fast on the shaft H, and at such time, if the shaft is rotated by the belt on the fast-pulley $f$, the quill will be driven by the clutch part $a$ in the direction to effect the regular forward rotation of the doffer, the toothed hub 14 at such time turning the gear 4 to drive the chain $E^2$ and shaft D, and at the same time, by reason of the bevel-gear 8 on the shaft H, the rollers of the railway-head are driven in the proper and customary direction for regular work. The slide-bar 13, at its outer end, has joined to it a hand-lever, $e$, pivoted at $e'$.

The railway-head will be provided with the usual belt-shifting mechanism, (not shown,) which, in case of necessity, is operated in the usual manner to shift the driving-belt from the fast to the loose pulley, which effects the stopping of the railway-head and doffer. The placing of the belt upon the loose pulley immediately starts the loose gear and clutch part $a^3$; but, as the latter is not in contact with the end of the quill, the latter is not rotated. While the doffer is thus stopped, such of its teeth as are left at rest in the line of movement of the teeth of the rotating main cylinder are substantially stripped, and the cotton so removed is accumulated in a bunch or ridge from end to end of the doffer just below the point where the teeth of the doffer and the main cylinder pass.

The difficulty remedied which made it necessary to stop the doffer and the railway-head, the operator, just before moving the regular belt-shifter to replace the driving-belt on the fast pulley, will move the handle $e$ and the slide-bar 13 sufficiently to move the left-hand end of the quill into engagement with the moving clutch part $a^3$, which latter will immediately drive the quill in the reverse of its usual direction of rotation, and, through the gear 4, chain $E^2$, and shaft D, will start the doffer in motion, but in the reverse of its usual direction; and the operator, by his hand upon the said lever, will keep the clutch part $a^3$ and quill in engagement until the doffer has been rotated for about one-fourth of a rotation, or sufficiently to carry the stripped part of the doffer, before referred to, above the point where the teeth of the doffer and main cylinder come in contact. This reverse rotation of the doffer is sufficient to also place the cotton accumulated thereon, as described, above such point of contact. This done, the operator releases the handle $e$, when the spring 19 effects the disengagement of the quill from the clutch part $a^3$, and immediately thereafter the operator actuates the usual belt-shifter and starts the railway-head and doffer in the direction of its regular rotation, the spring 19, acting on the rod 13 and finger 12, causing the quill to be forced against the clutch part $a$. The motion of the doffer, having been reversed for a short distance, as stated, before it is started in its regular direction of rotation, enables the fiber accumulated on the doffer, as stated, to be evened and the stripped teeth to again have cotton deposited upon them by the main cylinder; otherwise the sliver at that part of the doffer which was stripped, when it comes to the usual doffer-comb (not shown) would be completely removed from the doffer, or the sliver would fail to be continuous beyond the stripped line of the doffer.

The quill and toothed parts co-operating with it at each end constitute a clutch or reversing mechanism or gear; and, having shown one practical form of reversing mechanism or gear, itself well known in the mechanic arts, I desire it to be understood that instead thereof I may employ any other usual or well-known reversing mechanism or gear which will enable the doffer to be automatically reversed (shaft D driven from the railway-head to be reversed) as to the direction of its rotation when the latter is first started, and then to permit the said shaft to be run in the direction of its regular or forward rotation, as has been described. The reversal of the usual feeding-rollers in unison with the doffer is insufficient to in any manner affect the sliver.

In practice, the shaft $B^3$, carrying the under roller of the rollers $B^2$, will be provided at its right-hand end, viewing Fig. 1, with a gear, which will be driven, as usual, from the pinion $D^4$ through an intermediate, the said gear and intermediate being, however, omitted.

I do not claim a doffer having a motion of rotation coupled with a motion of reciprocation back and forth in the direction of rotation, thus giving to the doffer a constantly-varying fast or slow speed—as, for instance, in English Patent No. 721 for 1871.

I claim—

1. The combination, with the main cylinder, of a doffer and mechanism, substantially as described, to automatically rotate the doffer backward for a short distance preparatory to starting the movement of the doffer in its regular forward direction, substantially as and for the purpose described.

2. The main cylinder of a carding-machine, the doffer, the shaft D, and mechanism, substantially as described, between it and the shaft of the doffer, to rotate the latter, combined with the shaft H, of the railway-head and mechanism, substantially as described, between it and the shaft D, to rotate the latter backward for a short distance before commencing to rotate the said shaft D forward, the preliminary reversal of the shaft D effecting the backward rotation of the doffer for a short distance, as and for the purpose described.

3. The carding-cylinder, the doffer, a quill, and intermediate mechanism, substantially as described, to rotate the doffer, combined with mechanism, substantially as described, to rotate the said quill in one and then in the opposite direction, whereby the movement of the doffer may be reversed for a short distance prior to being started in its regular direction, for the purposes described.

4. The carding-cylinder and the doffer and rolls of the railway-head and mechanism, substantially as described, to conduct the sliver from the doffer to the said rolls, and the shaft H and the quill and mechanism, substantially as described, intermediate the said shaft and quill, and the doffer to actuate them, combined with mechanism, substantially as described, to effect the engagement of the said quill and its rotation in the reverse direction on the said shaft H to rotate the doffer in the reverse direction, as and for the purpose described.

5. The shaft H of the railway-head, its fast pulley, and the quill, gear $c$, provided with the clutch part $a^3$, loose on the said shaft, combined with the loose pulley having the pinion $l'$, intermediate $l^2$, and the shaft $d'$, provided with pinions $d$ $d^2$, whereby the quill may be rotated on the shaft H, while the latter is at rest, substantially as described.

In testimony whereof I have signed my name to this specification in the presence of two subscribing witnesses.

PHILIP T. BEGLEY.

Witnesses:
G. W. GREGORY,
W. H. SIGSTON.